Figure 1:
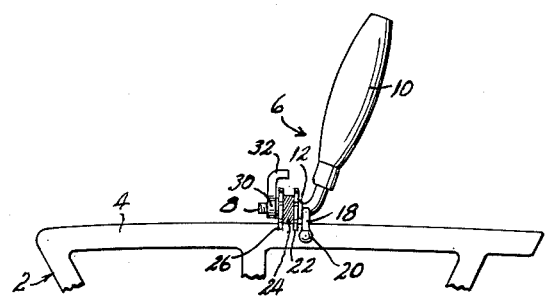

April 11, 1961

R. R. BRATTON 2,978,930

TOOL FOR SHARPENING ICE SKATES

Filed Aug. 27, 1959

INVENTOR.
Roy R. Bratton
BY John A. Hamilton
Attorney.

United States Patent Office

2,978,930
Patented Apr. 11, 1961

2,978,930

TOOL FOR SHARPENING ICE SKATES

Roy R. Bratton, Rte. 4, Lee's Summit, Mo.

Filed Aug. 27, 1959, Ser. No. 836,355

6 Claims. (Cl. 76—83)

This invention relates to new and useful improvements in tools for sharpening ice skates, and is an improvement over the device shown in my copending application Serial No. 809,688, filed April 29, 1959.

My prior invention as disclosed in the above identified application involved the use of a circular cutter wheel adapted to be moved along the blade for a skate with its axis parallel to the blade edge and with its curved edge contacting the blade whereby to remove metal therefrom. The curvature of the cutter wheel caused the skate blade to be cut in a transversely concave form, as is desirable and customary. The device also included a pair of circular guide discs mounted coaxially with the cutter wheel and each having a series of radial notches formed in the edge thereof. The discs could be rotated selectively, so that the notch corresponding to the blade thickness of any particular skate could be brought into position to be fitted slidably over the edge of the skate blade. The guide disc served to guide the cutter wheel with respect to the blade during use.

However, certain difficulties arose with said prior structure, in regard to proper guidance of the cutter wheel relative to the blade, and the overcoming of these difficulties is the primary object of the present invention. In the prior structure, two guide discs were necessary to provide space for a sufficient number of notches to cover the range of blade thicknesses in common usage. The narrower notches were formed in one disc and the wider notches in the other disc, and both discs were disposed at one side of the cutter wheel in face-to-face relation. The disc with the narrower notches had one notch as wide as the widest notch in the other disc, so as to permit usage of the disc with the wider notches. As a result, except in rare instances, if one notch in one disc was in use, it had to be matched with a much wider notch in the other disc, so that no guiding effect was obtained from said other disc. Therefore, since the operative notch must have at least a sliding clearance with the blade, the tool could wobble by the tilting of the cutter wheel axis in a plane parallel to the blade edge, and chattering and uneven cutting resulted in some cases. In the present structure the successive notches, as to width, are formed alternately in the two discs. Therefore, whenever one notch is fitted as closely as possible over the skate blade, the next wider notch will always be in the other disc, and may also be brought into registry with the first notch to engage the blade also. Since the width increments of the notches are small, this provides that the blade will receive guidance through the combined thickness of both guide discs. While the guidance thus obtained will not be perfect since one notch is wider than the other, it will nevertheless substantially reduce the wobbling above referred to, and improve the efficiency of the tool.

Guidance of the cutter wheel is further improved by separating the two guide discs a substantial distance apart in the direction of the axis of the cutter wheel. Obviously, with the two-point support supplied by the discs, the angular extent of the wobbling permitted by any looseness of the blade in the notch of either disc will be reduced as the distance between the discs is increased. The displacement of the cutter wheel laterally of the skate blade caused by said wobbling is still further reduced by placing the cutter wheel intermediate the two discs.

Other objects are simplicity and economy of construction, ease and convenience of operation, and long life without sharpening or other servicing.

Figure 2:
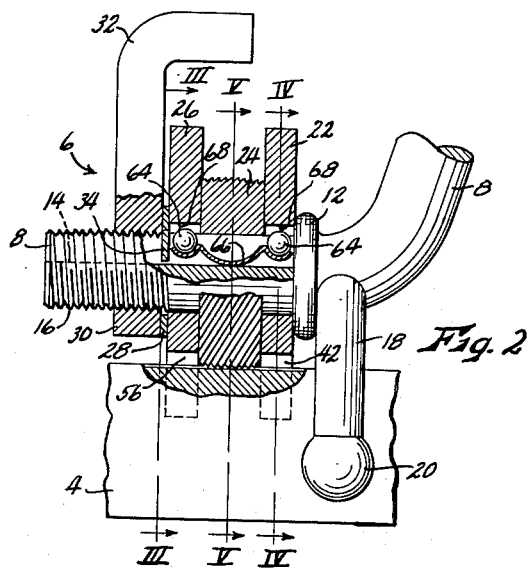
Figure 3:
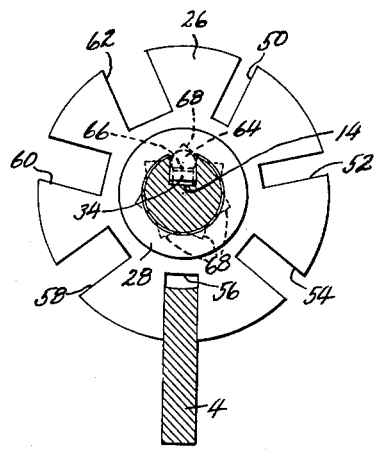
Figures 4, 5:
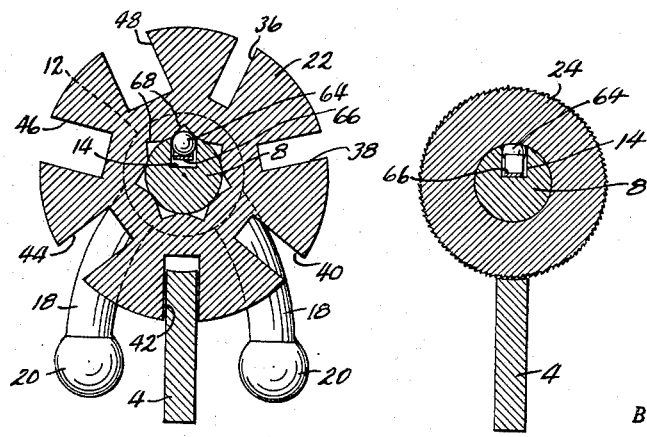

With these objects in view, as well as other objects which will appear in the course of the specification, reference will be had to the drawing, wherein:

Fig. 1 is a side elevational view of a tool for sharpening ice skates embodying the present invention, shown in operative relationship to the blade of an ice skate, Fig. 2 is an enlarged fragmentary view similar to Fig. 1, with parts broken away and parts left in elevation, and Figs. 3, 4 and 5 are sectional views taken respectively on lines III—III, IV—IV and V—V of Fig. 2.

Like reference numerals apply to similar parts throughout the several views, and the numeral 2 applies generally to an ice skate shown only fragmentarily, being illustrated in an inverted position with its blade indicated at 4. The tool forming the subject matter of the present invention is indicated generally by the numeral 6, and includes a short stub shaft 8 which in use is disposed substantially parallel to the edge of blade 4 and which serves as a frame for supporting the operative parts of the tool. At one end said shaft is angled upwardly and has affixed thereto a handle 10 by means of which the tool is manipulated. An upset shoulder 12 is formed on the shaft adjacent the angle thereof. Said shaft has a longitudinal groove 14 formed therein extending from shoulder 12 to the free end of the shaft, and the free end portion of the shaft is threaded as indicated at 16. Welded or otherwise affixed to shaft 8 intermediate shoulder 12 and the angle thereof, are a pair of downwardly divergent guard arms 18, each of said arms terminating at its lower end in a spherical formation 20. The purpose and function of these guard arms will be more fully described below.

Mounted on shaft 8 successively, starting from shoulder 12, is a guide disc 22, a cutter wheel 24, a guide disc 26, a washer 28, and a nut 30. Nut 30 is engaged on the threads 16 of the shaft and urges the remaining elements closely together and against shoulder 12. Said nut is provided with a radially projecting arm 32, whereby it may be easily loosened or tightened. Washer 28 is provided with an inwardly projecting tongue 34 which extends into groove 14 of the shaft to prevent rotation of the washer on the shaft. In this manner the rotary motion of the nut is prevented from tending to turn the guide discs and the cutter wheel on the shaft. Cutter wheel 24 is circular, and is mounted concentrically and rotatably on shaft 8. The radius of the wheel corresponds to the radius of transverse curvature to which is desired to form the skate blade 4, so that when the wheel is held against the blade as shown, with its axis parallel to the blade, and moved longitudinally along the blade, the wheel will cut metal from the blade to sharpen it and form it with the desired concavity. The cutter wheel has generally helical teeth generated on the surface thereof, in the manner of a file, and is formed of a high quality cutting compound such as tungsten carbide or the like. Also, the toothed face of the wheel is curved transversely in a convex form as shown, this form providing first that only one or two teeth will actually be operative at a given instant so that the tool will operate with less manual pressure against the blade, and second it provides that if the operator tilts the shaft slightly out of parallel with the blade edge in a vertical plane, the wheel will still present an operative face to the blade.

Guide discs 22 and 26 are each planar and circular, and mounted concentrically for rotation on shaft 8. Each of said discs has a series of radial notches formed in the edge thereof and spaced apart around its periphery. The notches of disc 22 are designated respectively by numerals 36, 38, 40, 42, 44, 46 and 48, and the notches of disc 26 by the numerals 50, 52, 54, 56, 58, 60, and 62. The guide discs are of greater diameter than cutter wheel 24, and the root diameters of the disc notches are less than the cutter wheel diameter, so that when the proper pair of notches of the guide discs are fitted over the skate blade 4, the cutter wheel will engage the blade and be guided by said discs in proper relation to the blade.

The notches of the guide discs are of graduated widths, with successively wider notches being disposed in alternate discs. For example, notches 36 to 48 inclusive of disc 22 may have widths respectively of .08, .10, .12, .14, .16, .18 and .19 inch, and notches 50 to 62 inclusive of disc 26 may have widths respectively of .07, .09, .11, .13, .15, .17 and .19 inch. Thus when the smallest possible notch of either disc is engaged over the blade, the next larger notch will always be available in the other disc to engage the blade. Thus any wobbling of the cutter axis in a plane parallel to but spaced apart from the face of the blade edge is reduced to a minimum, and the cutter will be guided with the greatest possible accuracy consistent with the maximum adaptability of the tool to sharpen blades of different thicknesses. Furthermore, the accuracy of guidance of the cutter wheel is increased by the fact that the two guide discs are spaced apart longitudinally of the blade. Obviously, any lateral wobbling of the cutter which might be permitted by any looseness of the notches on the blade is decreased as the two guides are separated. The greater the distance of separation, the smaller the angularity of wobbling which will be permitted. Also, the placement of the cutter wheel intermediate the guide discs contributes to accuracy of tool guidance. Wobbling of the tool axis as described will of course be accompanied by movement of the guide discs transversely to the blade, the greater movement of course being by the disc with the wider notch, but this lateral movement is less at all points intermediate the discs, and this reduced movement is utilized by placing the cutter wheel intermediate the discs. Notch 48 of disc 22 need not be any wider than the widest notch 62 of disc 26, since notch 62 represents the thickest blade which can be sharpened. Obviously, each disc must have at least one notch as wide as the widest notch of the other disc, so that every notch of both discs may be utilized.

In use, the notch of each disc to be utilized is brought into an operative position extending vertically downwardly, in alignment with the opening between guard arms 18. Said guard arms serve to engage the blade 4 and support the tool to prevent the operator from cutting his hands on the skate blade, in the event the guide discs should become disengaged from the blade. Adjustment of the guide discs is accomplished by loosening nut 30 and turning said discs manually on shaft 8. The narrowest slot of either disc which will fit over blade 4 is brought into operative position opening vertically downwardly, the next larger slot which will always be in the other disc is also brought into operative position, and nut 30 tightened. The guide discs must be clamped tightly against rotation on shaft 8 during use, both for safety and for accuracy of operation. Also, it has been found desirable to clamp the cutter wheel rigidly during use, since even the slight clearances necessary and unavoidable in a rotatable mounting tend to cause chattering of the cutter as it is dragged along the blade. However, it will be seen that whenever the guide discs are adjusted, they will also cause a random turning of the cutter wheel on the shaft, so that fresh portions of the wheel surface will be periodically brought into operative position. Also the wheel may be turned intentionally at any time by loosening nut 30, if a sector of the wheel should become worn.

In order to assist in properly and accurately aligning the notch of one guide disc with the desired notch of the other disc, and to hold the selected pair of notches in proper alignment with guard arms 18 as nut 30 is tightened, each guide disc is provided with a detent ball 64 carried in groove 14 of shaft 8. Said balls are urged outwardly by a leaf spring 66 seated in groove 14, each ball engaging selectively any one of a series of tapered notches 68 formed in angularly spaced apart relation in the internal periphery of one of the guide discs. The notches 68 of each disc correspond in number and spacing to the guide notches 36—48 or 50—62 of said disc, so that when the detent ball 64 engages one of notches 68, the disc will be held releasably with one of its guide notches in operative position opening vertically downwardly.

While I have shown and described a specific embodiment of my invention, it will be readily apparent that many minor changes of structure could be made without departing from the spirit of the invention as defined by the scope of the appended claims.

What I claim as new and desire to protect by Letters Patent is:

1. A tool for sharpening ice skates comprising a frame including a shaft, a cutter wheel having cutting teeth on its periphery and mounted coaxially on said shaft, and a pair of circular guide discs mounted coaxially on said shaft for independent rotation thereon, each of said discs having a series of radial slots formed in angularly spaced relation in the edge thereof, said discs being of greater diameter than said cutter wheel and said notches extending to a diameter less than that of said cutter wheel, said notches being generally of graduated widths, with notches of successive widths being formed alternately in one disc and the other.

2. A tool as recited in claim 1 with the additional provision that at least one notch of each guide disc is as wide as the widest notch of the other guide disc.

3. A tool as recited in claim 1 with the addition of a pair of detents for securing said guide discs respectively at any of a series of angular positions relative to said shaft, whereby any notch of either disc may be brought into angular alignment with any notch of the other disc.

4. A tool as recited in claim 3 wherein said detents are spring-loaded and are not sufficient to secure said discs against rotation by substantial manual pressure, and with the addition of clamping means for substantially locking said guide discs against rotation.

5. A tool as recited in claim 1 wherein said guide discs are spaced substantially apart in a direction parallel to the axis of said cutter wheel.

6. A tool as recited in claim 1 wherein said guide discs are spaced substantially apart in a direction parallel to the axis of said cutter wheel, and are disposed respectively at opposite sides of said cutter wheel.

References Cited in the file of this patent

UNITED STATES PATENTS

| | | |
|---|---|---|
| 1,672,547 | Swartz | June 5, 1928 |
| 2,251,849 | Mawle | Aug. 5, 1941 |